United States Patent
Hughes et al.

(10) Patent No.: US 6,370,600 B1
(45) Date of Patent: Apr. 9, 2002

(54) STAGING BUFFER FOR TRANSLATING CLOCK DOMAINS WHEN SOURCE CLOCK FREQUENCY EXCEEDS TARGET CLOCK FREQUENCY

(75) Inventors: William A. Hughes, Sunnyvale, CA (US); Larry D. Hewitt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 0 days.

(21) Appl. No.: 09/320,127

(22) Filed: May 25, 1999

(51) Int. Cl.[7] .................................................. G06F 3/00
(52) U.S. Cl. ............................ 710/29; 710/52; 713/400
(53) Field of Search ............................. 710/29, 52, 53, 710/56, 58; 713/400

(56) References Cited

U.S. PATENT DOCUMENTS

| | | | | |
|---|---|---|---|---|
| 4,419,739 A | | 12/1983 | Blum | 364/900 |
| 4,866,310 A | | 9/1989 | Ando et al. | 307/480 |
| 5,045,725 A | | 9/1991 | Sasaki et al. | 307/465 |
| 5,224,129 A | | 6/1993 | Lueker et al. | 375/118 |
| 5,448,715 A | | 9/1995 | Lelm | 713/600 |
| 5,640,605 A | * | 6/1997 | Johnson et al. | 395/881 |
| 5,768,529 A | | 6/1998 | Nikel et al. | 395/200.62 |
| 5,867,731 A | * | 2/1999 | Williams et al. | 395/849 |
| 5,999,023 A | | 12/1999 | Kim | 327/144 |
| 6,067,629 A | * | 5/2000 | Murray et al. | 713/400 |
| 6,269,413 B1 | * | 7/2001 | Sherlock | 710/52 |

OTHER PUBLICATIONS

AMD Athlon [198] Processor Technical Brief, Dec. 1999, © Advanced Micro Devices, Inc., pp. 1–7.
AMD Athlon [198] Processor Module Data Sheet, Jun. 2000, 201 Advanced Micro Devices, Inc., pp. 1–64.
LXT9785 Data Sheet, Sep. 2000, © Level One Communications, Inc., pp. 1–105.

* cited by examiner

*Primary Examiner*—Thomas Lee
*Assistant Examiner*—Harold Kim
(74) *Attorney, Agent, or Firm*—Conley, Rose & Tayon, PC; Lawrence J. Merkel (57) ABSTRACT

An apparatus is configured to monitor the source and target clocks (e.g., receive and transmit clocks, respectively, each from different clock domains) to determine if the respective frequencies of the clocks lead to more data being received by a buffer used to communicate between the two devices than is transmitted from that buffer. Upon detecting such a situation, a staging buffer is used to pre-read entries from the buffer and transfer these entries to the output of the buffer. Effectively, the transmit data pipeline may be dynamically extended by a stage comprising the staging buffer. The staging buffer continues to be used until a synchronization event occurs. A synchronization event allows for the transmit logic to "catch up" by, e.g., processing two items of information from the buffer concurrently.

27 Claims, 9 Drawing Sheets

STAGING BUFFER FOR TRANSLATING CLOCK DOMAINS WHEN SOURCE CLOCK FREQUENCY EXCEEDS TARGET CLOCK FREQUENCY

BACKGROUND OF THE INVENTION

1. Field of the Invention

This invention is related to the field of computer systems and, more particularly, to translating data between clock domains in computer systems.

2. Description of the Related Art

Computer systems are increasingly including larger numbers of components for improving performance. For example, high performance computer systems frequently including multiple processors (or CPUs) for concurrent execution of multiple programs or multiple portions of programs. Furthermore, computer systems may include additional input/output (I/O) devices for communicating with other computer systems or providing programs and data for execution.

As the number of devices in the computer system increases, it becomes more difficult to clock all of the devices in the computer system using clocks derived from a single clock source. Clocking numerous devices from a single clock source is difficult in terms of routing the clock lines from the source to all of the devices in a reasonably skew-controlled manner, driving the relatively large load of all the devices from the single source, etc. Accordingly, it is desirable to allow multiple clock sources within the computer system, even if clocks from devices interconnected via the same interface are clocked by clocks derived from different clock sources.

Since the clocks are derived from different sources, the clocks may experience dynamic variation with respect to each other. Dynamic variation may occur, e.g., due to temperature differences, voltage differences, accumulated phase error in a phase locked loop, or noise differences. Accordingly, clocks derived from different sources form different clock domains. Generally, a "clock domain" refers to the circuits which are clocked using clocks derived from a single clock source. A "clock" or "clock signal" is a signal repeating at a regular rate, or period. The number of times the period repeats per second is the frequency of the clock.

Devices which communicate via an interface but which belong to different clock domains may experience difficulties in communicating upon the interface. Generally, information conveyed via the interface is translated from one clock domain to another. A buffer (e.g. a FIFO buffer) may be used to translate information from one clock domain to the other. Buffer entries are allocated in response to the source clock signal corresponding to the source clock domain and are deallocated in response to the target clock signal corresponding to the target clock domain. The amount of time a particular item of information within the buffer is valid is increased by having multiple buffer entries, allowing time to process each item and time for the variations between the source and target clocks. As used herein, the term "buffer" refers to one or more clocked storage elements (e.g. registers, flops, latches, RAM arrays, etc.).

Unfortunately, buffers alone do not solve the problem of a persistent difference in frequencies between the source clock and the target clock, even though the source and target clocks may nominally be operating at the same frequency. For example, the source clock may be operating at a slightly greater frequency than the target clock. The source may, e.g., provide one item of information per (source) clock on the interface and the target may consume one item of information per (target) clock from the interface. In this case, over some time interval, the source provides more items of information than the target can consume. While an additional buffer entry within the FIFO buffer could be allocated to handle the first occurrence of the additional data, the second occurrence would still not be handled. It is difficult and expensive to eliminate all frequency difference between clock signals from different clock domains. Furthermore, it is undesirable to stall the transfer of information upon the interface when the source clock is operating at a higher frequency than the target clock to allow for the target device to process the additional item. Such stalling is undesirable from a performance standpoint, and may introduce undesired complexities as well. Accordingly, a solution to communicating between devices from different clock domains which handles variations in clock frequency between the clock domains without inserting delays on the interface between the devices is needed.

SUMMARY OF THE INVENTION

The problems outlined above are in large part solved by an apparatus as described herein. Generally, the apparatus is configured to monitor the source and target clocks (e.g., receive and transmit clocks, respectively, each from different clock domains) to determine if the respective frequencies of the clocks lead to more data being received by the buffer used to communicate between the two devices than is transmitted from that buffer. Upon detecting such a situation, a staging buffer is used to pre-read entries from the buffer and transfer these entries to the output of the buffer. Effectively, the transmit data pipeline may be dynamically extended by a stage comprising the staging buffer. The staging buffer continues to be used until a synchronization event occurs. A synchronization event allows for the transmit logic to "catch up" by, e.g., processing two items of information from the buffer concurrently. Advantageously, the receive clock frequency may exceed the transmit clock frequency by an amount dependent upon the minimum frequency of synchronization events, and the staging buffer operated as described herein may account for the frequency differences. Furthermore, no stalling on the interface between devices may be required as the items continue to be processed from the buffer.

Broadly speaking, an apparatus for translating data from a first clock domain to a second clock domain is contemplated. The apparatus comprises a buffer, a staging buffer, and control logic. The buffer comprises a plurality of entries and is clocked by a first clock signal corresponding to the first clock domain. Each of the plurality of entries is configured to store a datum being translated from the first clock domain to the second clock domain. Coupled to receive a first datum read from the buffer, the staging buffer is clocked by a second clock signal corresponding to the second clock domain. Coupled to receive the first clock signal and the second clock signal, the control logic is configured to monitor the first clock signal and the second clock signal to determine if, during a period of the second clock signal, an amount of data received by the buffer exceeds an amount of data read from the buffer. Additionally, the control logic is configured to detect a synchronization event. The control logic is configured to selectively forward one or both of: (i) the first datum, and (ii) a second datum read from the buffer responsive to determining the amount of data and to detecting the synchronization event. Moreover, a computer system including a first processing node and a second processing node including the apparatus is contemplated. The first processing node is coupled to a link including one or more data lines and a clock line, and is configured to drive data upon the data lines and a first clock signal upon the clock line. The second processing node is coupled to the link, and is configured to receive the data according to the first clock signal and to process the data according to a second clock signal derived from a different source than the first clock signal.

Additionally, a method for translating data from a first clock domain to a second clock domain is contemplated. Data is received into a buffer according to a first clock signal corresponding to the first clock domain. A first datum is read from the buffer into a staging buffer according to a second clock signal corresponding to the second clock domain. A second datum is from the buffer according to the second clock signal. The first datum and the second datum are selectively transmitted into the second clock domain responsive to determining if, during a period of the second clock signal, an amount of data received by the buffer exceeds an amount of data read from the buffer and further responsive to detecting a synchronization event.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
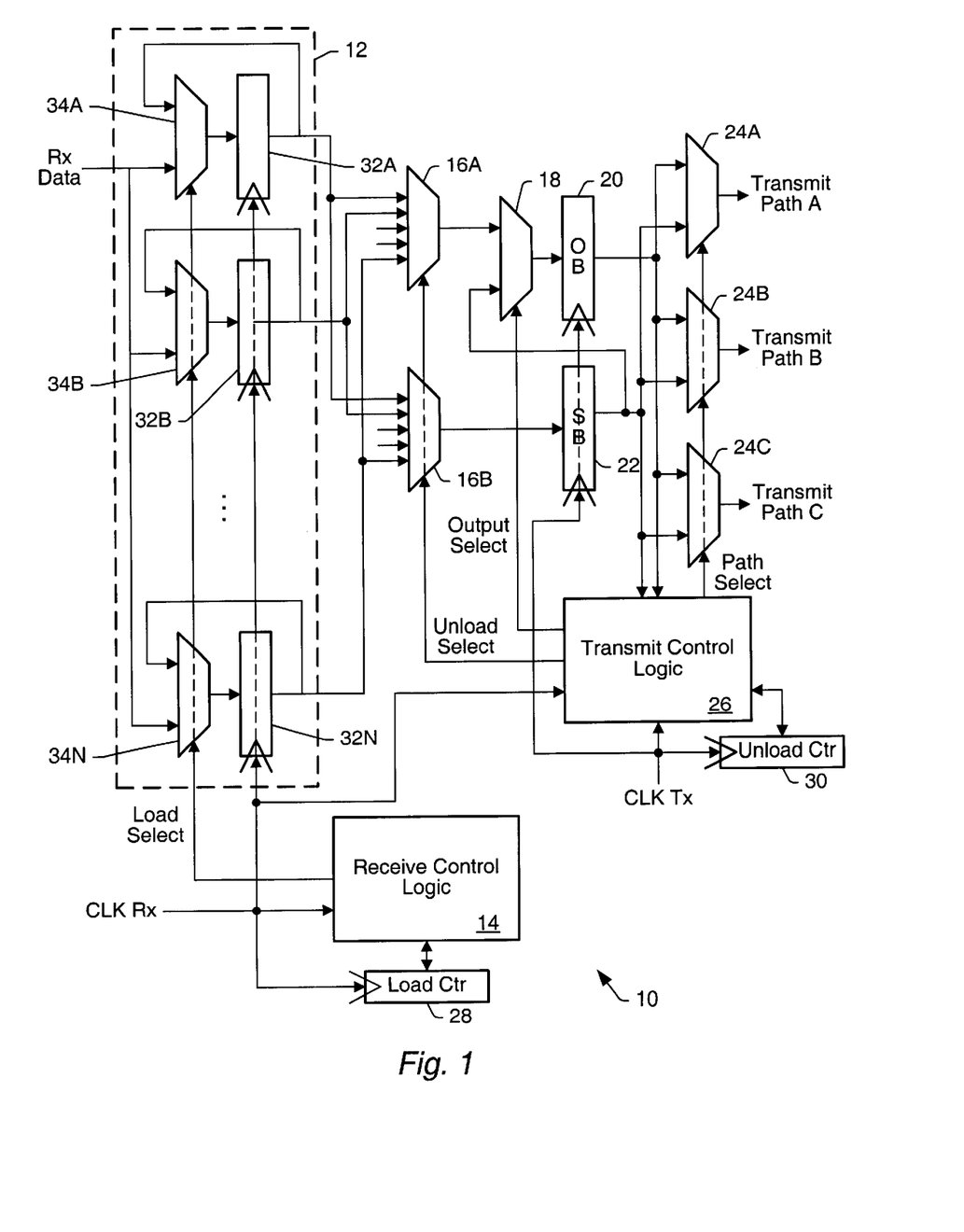
FIG. 1 is a block diagram of one embodiment an apparatus for translating data between two clock domains.

Turning now to FIG. 1, an apparatus 10 for translating data between two clock domains is shown. Other embodiments are possible and contemplated. In the embodiment of FIG. 1, the apparatus 10 includes a buffer 12, receive control logic 14, unload multiplexors (muxes) 16A and 16B, an output mux 18, an output buffer 20, a staging buffer 22, transmit path muxes 24A–24C, and transmit control logic 26. Buffer 12 is coupled to receive data (Rx data in FIG. 1) and is clocked by a receive clock signal (CLK Rx in FIG. 1). Receive control logic 14 selects an entry in buffer 12 to store the received data via load select signals shown in FIG. 1. Receive control logic 14 is coupled to receive the receive clock and is coupled to a load counter 28 which is clocked by the receive clock as well. Buffer 12 is further coupled to unload muxes 16A–16B, which are controlled via unload select lines by transmit control logic 26. Unload mux 16A is coupled as an input to output mux 18, which is also coupled to the output of staging buffer 22 and receives selection control via an output select line from transmit control logic 26. Staging buffer 22 is coupled to receive the output of unload mux 16B, and provides an input to transmit path muxes 24A–24C. Output buffer 20 is coupled to provide an input to transmit path muxes 24A–24C as well, and is coupled to receive an input from output mux 18. Both output buffer 20 and staging buffer 22 are clocked by a transmit clock signal (CLK Tx in FIG. 1) corresponding to the transmit clock domain including the transmit paths fed by transmit path muxes 24A–24C. Transmit control logic 26 is coupled to receive the outputs of output buffer 20 and staging buffer 22, and is coupled to receive the receive clock signal and the transmit clock signal. Transmit control logic 26 is further coupled to an unload counter 30 which is clocked by the transmit clock, and transmit control logic 26 still further provides path select controls to transmit path muxes 24A–24C. Buffer 12, in the embodiment of FIG. 1, comprises a plurality of flops 32A–32N and corresponding muxes 34A–34N coupled thereto. Muxes 34A–34N may select between the current contents of the corresponding flop 32A–32N and the received data under the control of the load select lines from received control logic 14. Accordingly, in the embodiment shown, each flop 32A–32N comprises an entry in buffer 12. Each flop 32A–32N is coupled to unload muxes 16A–16B.

Generally speaking, transmit control logic 26 is configured to monitor the receive clock and transmit clock to determine if the receive clock "gets ahead" of the transmit clock. Receive data is received by buffer 12 according to the receive clock and is removed from buffer 12 according to the transmit clock. If the receive clock is operating at a higher frequency than the transmit clock, the amount of data received will exceed the amount of data transmitted over some interval of time (and hence the receive clock will "get ahead" of the transmit clock) based on the frequency difference between the two clock signals. Particularly, the amount of data received in a period of the transmit clock may be greater than then amount of data processed during that period for certain periods within a time interval. The receive clock has gotten ahead in such a case. Viewed in another way, the receive clock is ahead of the transmit clock if during a time interval comprising any integral number of transmit clock periods, the amount of data received by buffer 12 exceeds the amount of data transmitted from buffer 12. To prevent buffer 12 from being overrun (in which some of the received data may be lost), transmit control logic 26 detects the situation in which the receive clock gets ahead of the transmit clock and uses the staging buffer 22 to handle the additional received data.

More particularly, transmit control logic 26 may be configured to read the oldest entry within buffer 12 (i.e. the entry storing data which was received, in time order, before any other data currently stored in buffer 12) using unload mux 16A. Transmit control logic 26 reads the next oldest entry within buffer 12 (i.e. the entry storing valid data which is adjacent to the oldest entry within buffer 12) using unload mux 16B. In other words, unload mux 16A reads the next entry to be transmitted from buffer 12 into the transmit paths fed by apparatus 10 (according to unload counter 30), and unload mux 16B reads the succeeding entry. The output of mux 16B is stored into staging buffer 22. During times that the receive clock is not ahead of the transmit clock, the output of unload mux 16A is selected through output mux 18 to be stored in output buffer 20, and the contents of staging buffer 22 are effectively ignored. However, upon detecting that the receive clock has gotten ahead of the transmit clock, transmit control logic 26 selects the contents of staging buffer 22 through output mux 18. Thus, output buffer 20 receives the contents of staging buffer 22 instead of the next entry read from buffer 12. Since staging buffer 22 previously read the contents of the next entry to be read, no data is lost. Furthermore, staging buffer 22 read the contents of the next entry prior to the receive clock getting ahead, so no data is lost due to being overwritten within buffer 12. Effectively, staging buffer 22 may be used to dynamically extend the transmit data pipeline upon detecting that the receive clock has gotten ahead.

Transmit control logic 26 continues operating unload muxes 16A–16B as described above and continues selecting the contents of staging buffer 22 through output mux 18 until transmit control logic 26 detects a synchronization event. A synchronization event is an event which allows the transmit clock domain to synchronize with the receive clock domain with respect to the number of data items passing through buffer 12. For example, a synchronization event in the present embodiment may comprise a first datum and a second datum being received adjacent in time and being transmitted from apparatus 10 via separate transmission paths. The first data item may be transmitted from output buffer 20 through one of transmit path muxes 24A–24C, while the second datum may be concurrently transmitted from staging buffer 22 through a different one of transmit path muxes 24A–24C. In this manner, two entries from buffer 12 are forwarded into the transmit clock domain concurrently. Transmit control logic 26 may also be configured to read the entry adjacent to the entry read into staging buffer 22 during the synchronization cycle using unload mux 16A, thus switching back to selecting unload mux 16A through output mux 18 into output buffer 20 and returning to the "normal" path of data from buffer 12 through buffer 20 to the transmit paths. Advantageously, frequency variation between the receive clock and the transmit clock in which the receive clock is operating at a greater frequency may be handled by the apparatus 10.

Apparatus 10 may correctly handle frequency variations in which the receive clock frequency is greater than the transmit clock frequency by a factor which is less than or equal to the frequency at which a first received datum and a second received datum adjacent to the first datum in time are routed through different transmit paths. For example, if one of the transmit paths A–C shown in FIG. 1 is used for data comprising command information and another one of the transmit paths is used for data comprising data corresponding to command information, adjacent command and data information received by buffer 12 may be a synchronization event. As another example, error checking data may periodically be received within buffer 12. One of the transmit paths A–C shown in FIG. 1 may be for error checking logic, to which the error checking data may be routed while data and/or command information may be routed to one of the other transmit paths.

It is noted that the terms "receive" and "transmit" have been used for convenience in the present discussion, and refer to receipt and transmission of data by buffer 12. However, the terms may be reversed if desired without affecting the present discussion. Generally, buffer 12 receives source data according to a source clock and transmits the data as target data according to a target clock.

Buffer 12 may, for example, be a first-in, first-out (FIFO) buffer which sequences received data through in the same order that data was received. Receive control logic 14 directs buffer 12 to receive data using the load select lines. For example, in the embodiment shown, receive control logic may provide a separate load select line to each mux 34A–34N. The entry selected for storing the received data is controlled to store the receive data path, and the remaining entries are controlled to store the same data currently stored therein. Load counter 28 indicates the entry which is to store the next received data, and is incremented as entries are filled with data according to the receive clock.

Similarly, transmit control logic 26 selects entries to be unloaded from buffer 12 using the unload counter 30. The entry indicated by unload counter 30 is selected through unload mux 16A, and the succeeding entry is selected through unload mux 16B. Unload counter 30 is generally incremented each time data is unloaded, thereby deleting the entry from buffer 12. The entry may subsequently be filled with additional received data by receive control logic 14. However, in the case in which two entries are being unloaded (e.g. upon detection of a synchronization event), unload counter 30 is adjusted by an extra increment to select the succeeding entry to the entry whose data is stored in staging buffer 22 during the synchronization event.

Additionally, the unload logic may be frozen in cases in which the transmit clock is ahead of the receive clock. Transmit control logic 26 may detect such situations in a manner similar to detecting that the receive clock gets ahead. By freezing the unload logic temporarily, an item is not unloaded and the receive and transmit clock domains remain in synchronization with respect to the number of data items loaded and unloaded from buffer 12.

In the present embodiment, transmit control logic 26 is further configured to receive the contents of output buffer 20 and staging buffer 22 (or a portion thereof) to determine which transmit path the received data is to be routed upon. In response to the contents, transmit control logic 26 generates path select signals on path select lines to transmit path muxes 24A–24C. In "normal" unload situations and time periods in which staging buffer 22 is being selected to fill output buffer 20, the contents of output buffer 20 are selected via one of transmit path muxes 24A–24C for processing by logic within the transmit clock domain. During the synchronization event, one of transmit path muxes 24A–24C selects the contents of output buffer 20 and a different one of transmit path muxes 24A–24C selects the contents of staging buffer 22.

Buffer 12 may comprise any suitable number of entries. For example, 4, 8 or 16 entries may be suitable. Generally, buffer 12 may include enough entries: (i) to allow for resynchronization between the receive clock and the transmit clock (in terms of data received) without the loss of any received data; and (ii) to compensate for latency in the detection (by transmit control logic 26) of additional data received due to the difference in transmit and receive clock frequencies.

It is noted that, in one embodiment, data is received upon both the rising and falling edges of the receive clock. Similarly, data is transmitted upon both the rising and falling edges of the transmit clock. Accordingly, buffer 12, staging buffer 22, and output buffer 20 capture data in response to both rising and falling edges. Similarly, load counter 28 and unload counter 30 are incremented in response to both the rising and falling edges. In other embodiments, data may be received and transmitted only on rising edges or only on falling edges, as desired.

Still further, data may be received on both rising and falling edges of the receive clock while data may be transmitted on only one edge of the transmit clock. Such an embodiment may transmit two adjacent entries per clock cycle (if the receive and transmit clocks are of approximately the same frequency). Other embodiments may reduce the nominal frequency of the transmit clock by an integer factor of the receive clock and transmit the integer number of adjacent entries per clock cycle (multiplied by two to adjust for received on both edges of the clock signal). For example, if the receive clock frequency is twice the transmit clock frequency, four adjacent entries may be transmitted per clock cycle.

It is still further noted that an alternative embodiment of apparatus 10 is contemplated in which mux 18 is not used. Instead, mux 16A may be directly connected to output buffer 20. Upon a synchronization event, transmit control logic 26 may be configured to control mux 16A to select the entry adjacent to and subsequent to the entry in staging buffer 22 (and may forward the data in both output buffer 20 and staging buffer 22) to accomplish synchronization.

Figure 2:
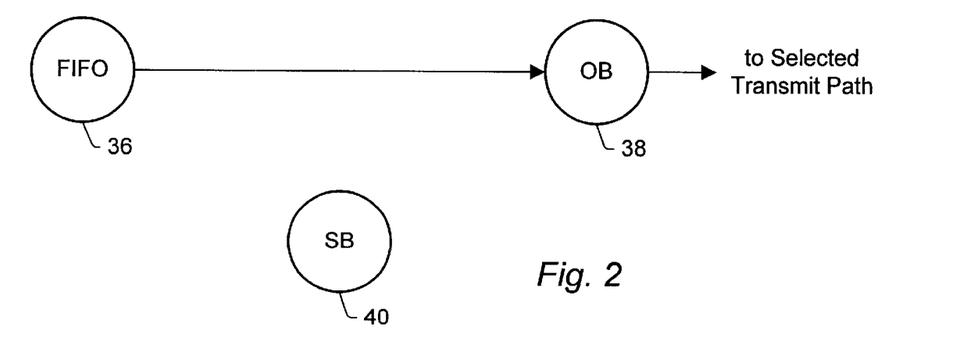
FIG. 2 is a diagram illustrating a flow of information in FIG. 1 while the receive clock is not ahead of the transmit clock.
Figure 3:
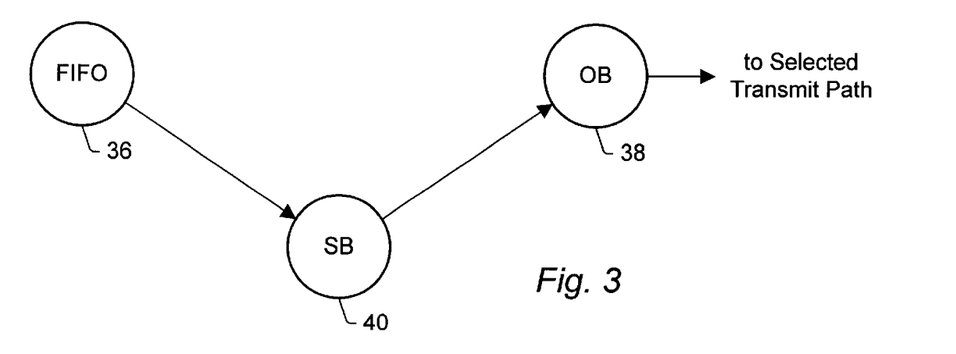
FIG. 3 is a diagram illustrating a flow of information in FIG. 1 while the receive clock is ahead of the transmit cock.
Figure 4:
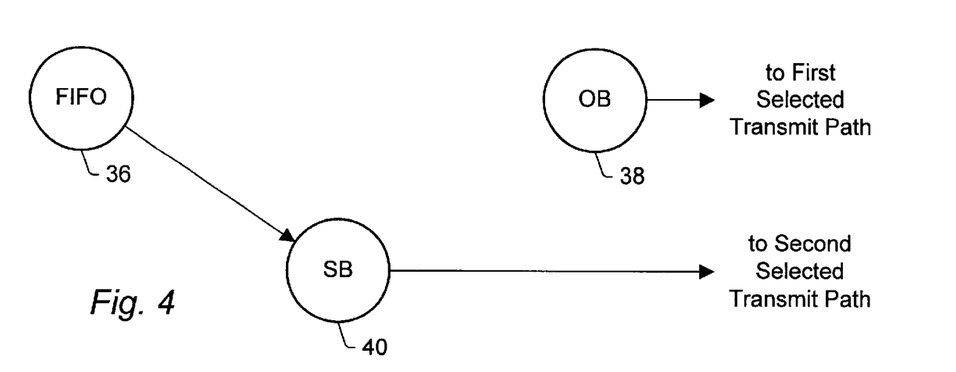
FIG. 4 is a diagram illustrating a flow of information in FIG. 1 during a synchronization event.

Turning next to FIGS. 2–4, diagrams illustrating the flow of data from buffer 12 through staging buffer 22 and/or output buffer 20 to selected transmit paths are shown. Reference numeral 36 represents an entry in buffer 12. Reference numeral 38 represents output buffer 20. Finally, reference numeral 40 represents staging buffer 22.

FIG. 2 illustrates the flow of data during times that the receive clock has not gotten ahead of the transmit clock. Since the receive clock has not gotten ahead of the transmit clock, data flows from buffer 12 through output buffer 38 to the selected transmit path. As described above, the succeeding entry within buffer 12 is stored into staging buffer 40, but the data is ignored until the receive clock is detected as getting ahead.

FIG. 3 depicts the flow of data upon detection of the receive clock getting ahead of the transmit clock (and for the time thereafter until the synchronization event is detected). In this case, data flows from buffer 12 through staging buffer 22 and then through output buffer 20 to the selected transmit path. Accordingly, the entry which is adjacent to the entry indicated by the unload pointer is placed into staging buffer 22 during each read, and the entry which is indicated by the unload pointer is placed into the output buffer 20 during that read.

FIG. 4 illustrates the flow of data during a synchronization event (e.g. the data in the output buffer is routed to a first selected transmit path and the data in the staging buffer is routed to a second selected transmit path). In the manner shown, two entries are concurrently transmitted from buffer 12 and the transmit time domain has effectively "caught up" with the receive time domain. The subsequent reads then return to the data flow illustrated in FIG. 2.

Figure 5:
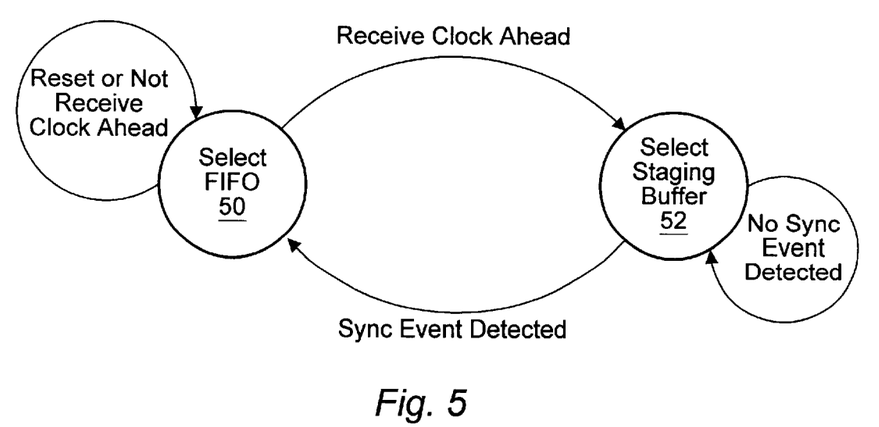
FIG. 5 is a state machine diagram illustrating one embodiment a state machine for controlling an input to the output buffer shown in FIG. 1.

Turning next to FIG. 5, a state machine diagram is shown illustrating an exemplary state machine which may be employed by one embodiment of transmit control logic 26 for selecting either data read from buffer 12 or the contents of staging buffer 22 through output mux 18. Upon reset, the state machine is in select FIFO state 50. While the state machine is in select FIFO state 50, transmit control logic 26 causes output mux 18 to select data read from buffer 12 (i.e. through unload mux 16A). The state machine remains in select FIFO state 50 until transmit control logic 26 detects that the receive clock has gotten ahead, at which time the state machine transitions to select staging buffer state 52.

While the state machine is in select staging buffer state 52, transmit control logic 26 selects the contents of staging buffer 22 through output mux 18. The state machine remains in select staging buffer state 52 until the synchronization event is detected, at which time the state machine transitions back to select FIFO state 50.

Figure 6:
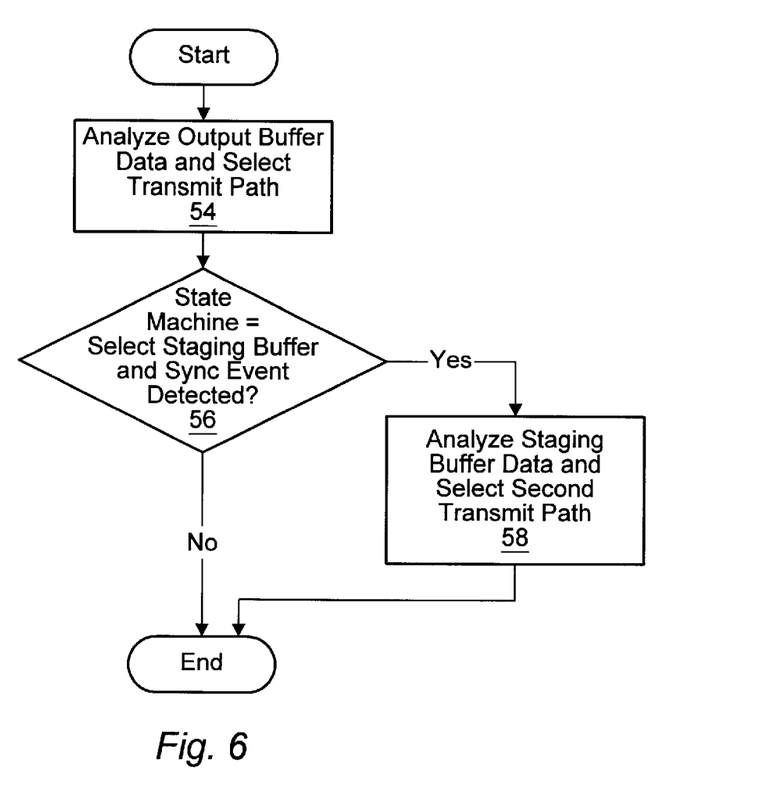
FIG. 6 is a flowchart illustrating one embodiment of logic for selecting transmit paths in FIG. 1.

Turning next to FIG. 6, a flowchart is shown illustrating the generation of path select signals by one embodiment of transmit control logic 26 for controlling transmit path muxes 24A–24C. Other embodiments are possible and contemplated. For each read cycle, transmit control logic 26 analyzes the data in output buffer 20 and selects a transmit path to which the data is routed (step 54). Transmit control logic 26 generates the path select signal for the transmit control mux 24A–24C corresponding to the selected transmit path to select the data from output buffer 20.

Additionally, transmit control logic 26 determines if the state machine of FIG. 5 is in select staging buffer state 52 and a synchronization event is occurring (decision block 56). If decision block 56 results in a true response, transmit control logic 26 analyzes the data in staging buffer 22 and selects a second transmit path different from the transmit path selected for the data in output buffer 20 (step 58). Transmit control logic 26 generates the second path select signal for the second transmit control mux 24A–24C corresponding to the second selected transmit path to select the data from staging buffer 22. Remaining path select signals may select a default selection, since no data is selected to be transmitted on the remaining transmit paths.

Figure 7:
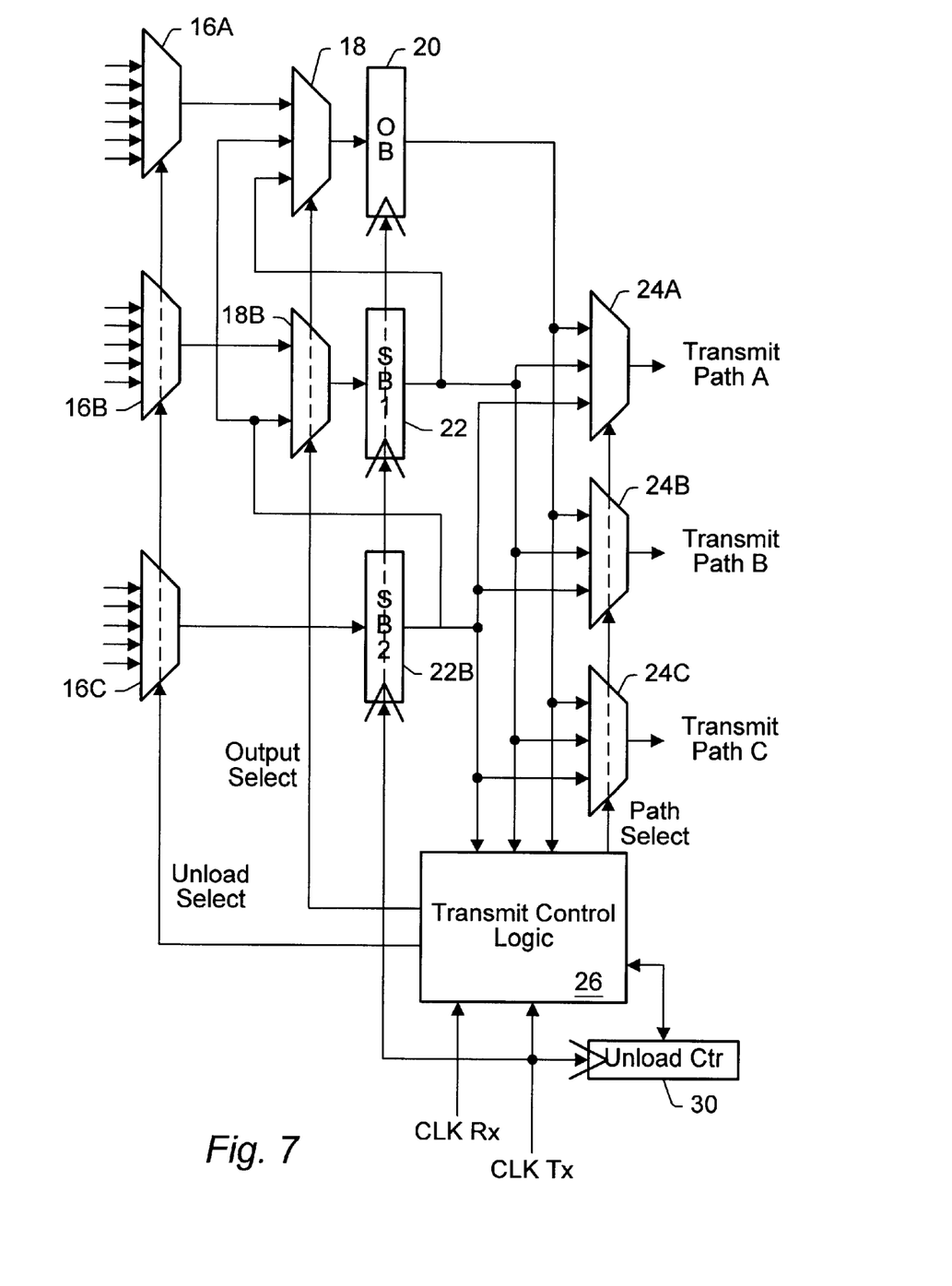
FIG. 7 is a block diagram of a second embodiment of a portion of the apparatus shown in FIG. 1.

Turning next to FIG. 7, a portion of a second embodiment of apparatus 10 is illustrated. Other embodiments are possible and contemplated. The portion shown in FIG. 7 may be interconnected with the remaining portions of the apparatus 10 as shown in FIG. 1. The embodiment shown in FIG. 7 includes unload muxes 16A–16B, and a third unload mux 16C coupled to the entries of buffer 12 and transmit control logic 26 in a manner similar to unload muxes 16A–16B. Additionally, the embodiment shown in FIG. 7 includes output mux 18, output buffer 20, and staging buffer 22 as shown in FIG. 1, except that staging buffer 22 is coupled to the output of a second output mux 18B which receives the output of unload mux 16B as an input. Still further, output mux 18 and second output mux 18B are coupled to receive the contents of a second staging buffer 22B, which is coupled to receive input from unload mux 16C. Second staging buffer 22B, like staging buffer 22 and output buffer 20, is clocked according to the transmit clock. The outputs of each of output buffer 20, staging buffer 22, and second staging buffer 22B are coupled to transmit control logic 26 and as inputs to transmit path muxes 24A–24C.

The embodiment of FIG. 7 provides for the receive clock to get up to two entries ahead before synchronization events occur, allowing for an even greater difference in frequency to exist. In general, adding N staging buffers allows for the receive clock to get up to N entries ahead. As described above, transmit control logic 26 may select the oldest entry within buffer 12 via unload mux 16A, and the next to oldest entry via unload mux 16B. Similarly, transmit control logic 26 may select the entry adjacent to and younger than the entry selected by unload mux 16B using unload mux 16C. In response to detecting the first instance of the receive clock getting ahead, transmit control logic 26 may control output mux 18 to select the output of staging buffer 22, as described above. However, output mux 18B may continue to select the output of unload mux 16B in this case. In response to detecting the second instance of the receive clock getting ahead, transmit control logic 26 may continue to select the output of staging buffer 22 through output mux 18 and may initiate selection of the output of staging buffer 22B through second output mux 18B. In this manner, yet another pipeline stage has effectively been inserted between buffer 12 and the transmit paths. Additional extensions up to N staging buffers may be implemented in a similar fashion.

Synchronizing events may operate in a similar manner as well. For example, if a first synchronizing event is detected while both staging buffers 22 and 22B are being selected by respective output muxes, then the contents of both the output buffer 20 and staging buffer 22 may be concurrently routed to transmit paths and the unload counter 30 may be incremented an additional entry. During the synchronization even, transmit control logic 26 may control output mux 18 to select the contents of staging buffer 22B to receive the next item of information to be processed, and unload mux 16B may be controlled to select the younger and adjacent entry to the entry corresponding to the item being selected by output buffer 20. Additionally, transmit control logic 26 may cause second output mux 18B to begin selecting the output of unload mux 16B. Occurrence of a subsequent second synchronizing event may operate as described above. Alternatively, if the data in output buffer 20, staging buffer 22, and staging buffer 22B are each routed to different transmit paths, transmit control logic 26 may select each to its respective transmit path concurrently, if desired.

Figure 8:
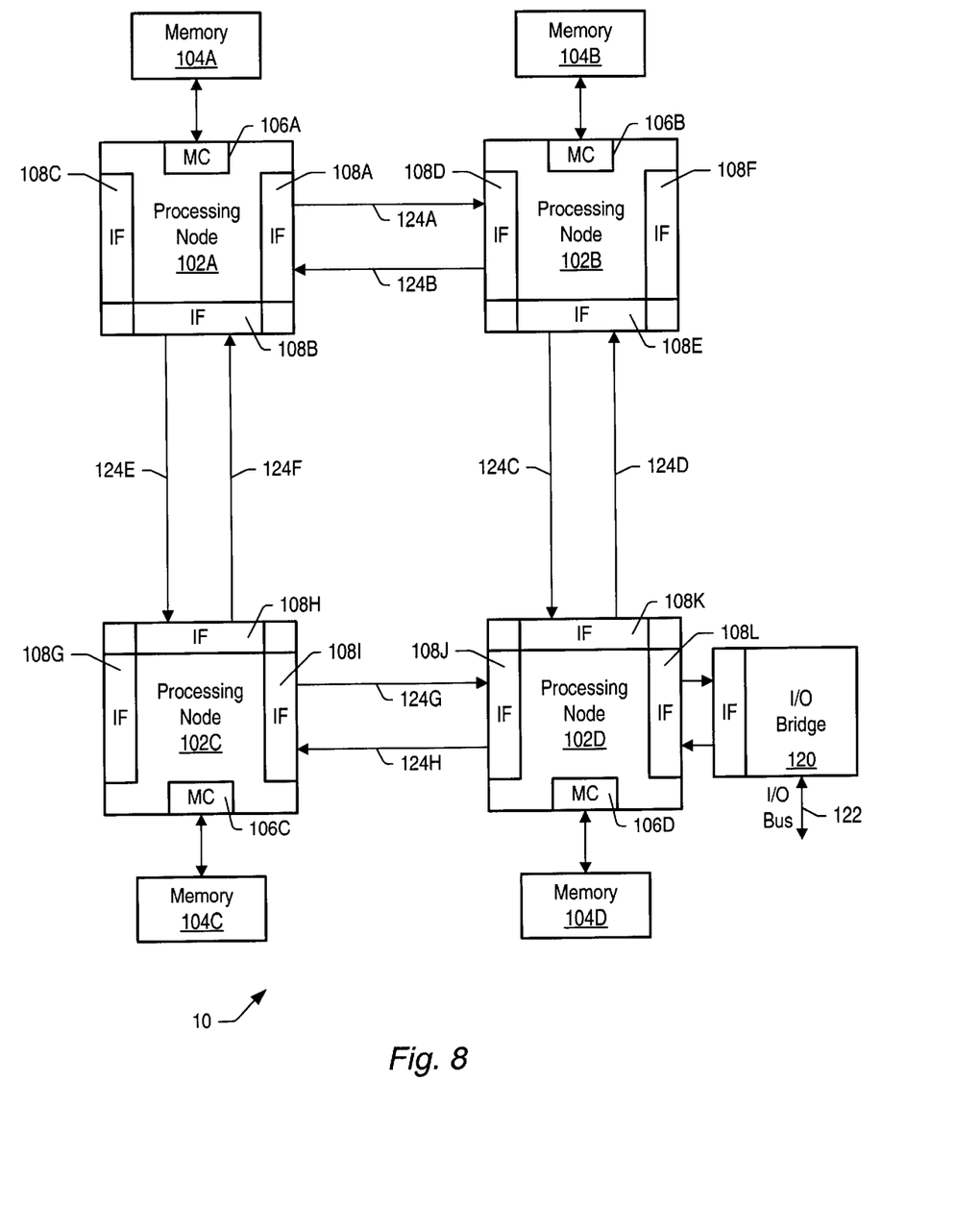
FIG. 8 is a block diagram of one embodiment of a computer system.

Turning now to FIG. 8, one embodiment of a computer system 100 is shown. Other embodiments are possible and contemplated. In the embodiment of FIG. 8, computer system 100 includes several processing nodes 102A, 102B, 102C, and 102D. Each processing node is coupled to a respective memory 104A–104D via a memory controller 106A–106D included within each respective processing node 102A–102D. Additionally, processing nodes 102A–102D include interface logic used to communicate between the processing nodes 102A–102D. For example, processing node 102A includes interface logic 108A for communicating with processing node 102B, interface logic 108B for communicating with processing node 102C, and a third interface logic 108C for communicating with yet another processing node (not shown). Similarly, processing node 102B includes interface logic 108D, 108E, and 108F; processing node 102C includes interface logic 108G, 108H, and 108I; and processing node 102D includes interface logic 108J, 108K, and 108L. Processing node 102D is coupled to communicate with an I/O bridge 120 via interface logic 108L. Other processing nodes may communicate with other I/O bridges in a similar fashion. I/O bridge 120 is coupled to an I/O bus 122 (which may employ a communication protocol similar to that employed between processing nodes as well).

Processing nodes 102A–102D implement a packet-based link for inter-processing node communication. In the present embodiment, the link is implemented as sets of unidirectional lines (e.g. lines 124A are used to transmit packets from processing node 102A to processing node 102B and lines 124B are used to transmit packets from processing node 102B to processing node 102A). Other sets of lines 124C–124H are used to transmit packets between other processing nodes as illustrated in FIG. 8. The link may be operated in a cache coherent fashion for communication between processing nodes or in a noncoherent fashion for communication between a processing node and an I/O bridge (or between I/O devices). It is noted that a packet to be transmitted from one processing node to another may pass through one or more intermediate nodes. For example, a packet transmitted by processing node 102A to processing node 102D may pass through either processing node 102B or processing node 102C as shown in FIG. 8. Any suitable routing algorithm may be used. Other embodiments of computer system 100 may include more or fewer processing nodes then the embodiment shown in FIG. 8.

Processing nodes 102A–102D, in addition to a memory controller and interface logic, may include one or more processors. Broadly speaking, a processing node comprises at least one processor and may optionally include a memory controller for communicating with a memory and other logic as desired.

Memories 104A–104D may comprise any suitable memory devices. For example, a memory 104A–104D may comprise one or more RAMBUS DRAMs (RDRAMs), synchronous DRAMs (SDRAMs), static RAM, etc. The address space of computer system 100 is divided among memories 104A–104D. Each processing node 102A–102D may include a memory map used to determine which addresses are mapped to which memories 104A–104D, and hence to which processing node 102A–102D a memory request for a particular address should be routed. In one embodiment, the coherency point for an address within computer system 100 is the memory controller 106A–106D coupled to the memory storing bytes corresponding to the address. In other words, the memory controller 106A–106D is responsible for ensuring that each memory access to the corresponding memory 104A–104D occurs in a cache coherent fashion. Memory controllers 106A–106D may comprise control circuitry for interfacing to memories 104A–104D. Additionally, memory controllers 106A–106D may include request queues for queuing memory requests.

Generally, interface logic 108A–108L may comprise a variety of buffers for receiving packets from the link and for buffering packets to be transmitted upon the link. Computer system 100 may employ any suitable flow control mechanism for transmitting packets. For example, in one embodiment, each interface logic 108 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

Figure 9:
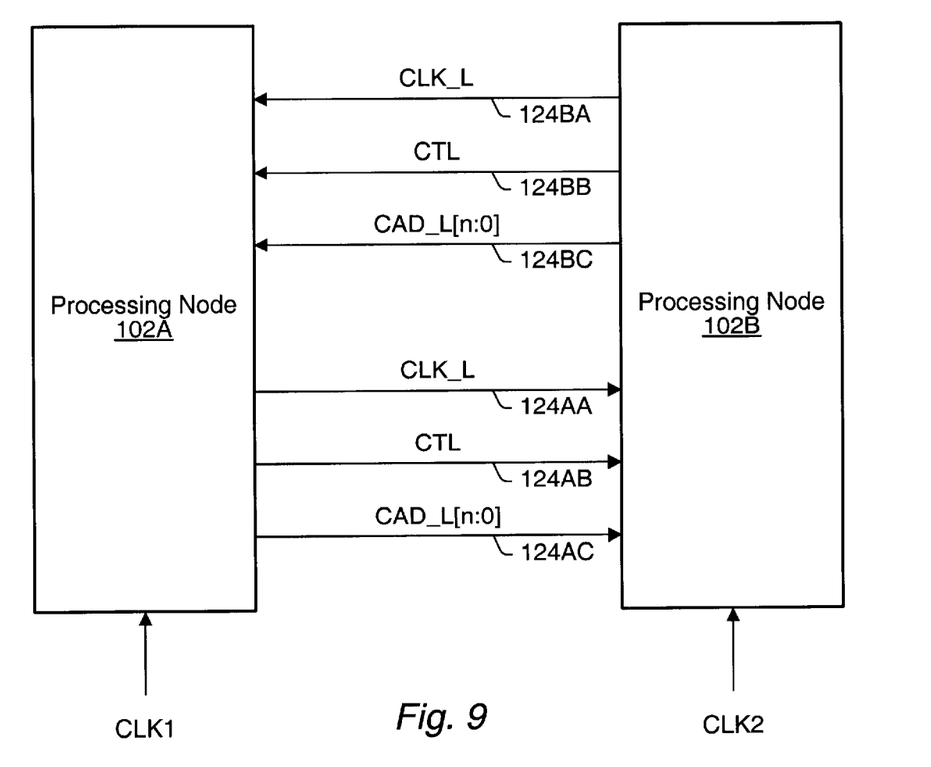
FIG. 9 is a block diagram illustrating one embodiment of a link between two processing nodes shown in FIG. 8.

Turning next to FIG. 9, a block diagram illustrating processing nodes 102A and 102B is shown to illustrate one embodiment of the links therebetween in more detail. Other embodiments are possible and contemplated. In the embodiment of FIG. 9, lines 124A include a clock line 124AA, a control line 124AB, and a control/address/data bus 124AC. Similarly, lines 124B include a clock line 124BA, a control line 124BB, and a control/address/data bus 124BC. Additionally, a clock line CLK1 is coupled to processing node 102A and a clock line CLK2 is coupled to processing node 102B.

Figure 10:
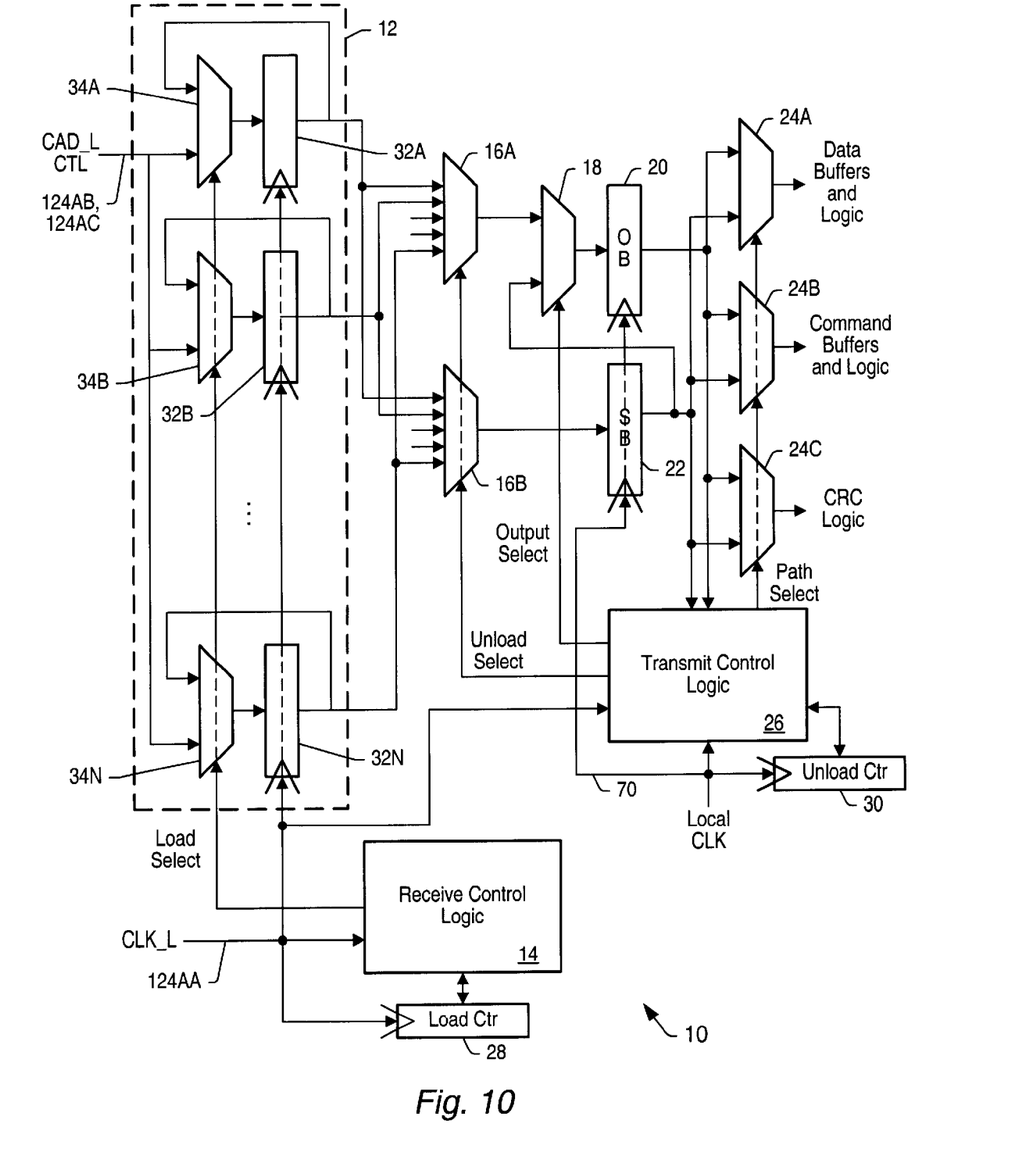
FIG. 10 is a block diagram of the apparatus shown in FIG. 1 implemented with the link of FIG. 9.

In the present embodiment, the clock signals on clock lines CLK1 and CLK2 may be separately sourced. Accordingly, there may be frequency variation between, for example, the clock signal CLK_L on line 124AA (which is derived from the clock signal on clock line CLK1) and the internal clock signal within processing node 102B used to receive the CTL signal on line 124AB and the CAD_L signals on lines 124AC. Processing node 102B (and other processing nodes 102, as desired) may employ apparatus 10 to translate the received CTL and CAD_L values from the CLK1 clock domain to the CLK2 clock domain. FIG. 10 (described in more detail below) illustrates one embodiment of apparatus 10 employed within processing node 102B.

The clock line transmits a clock signal which indicates a sample point for the control line and the control/address/data bus. In one particular embodiment, data/control bits are transmitted on each edge (i.e. rising edge and falling edge) of the clock signal. Accordingly, two data bits per line may be transmitted per clock cycle. The amount of time employed to transmit one bit per line is referred to herein as a "bit time". The above-mentioned embodiment includes two bit times per clock cycle. A packet may be transmitted across two or more bit times. Multiple clock lines may be used depending upon the width of the control/address/data bus. For example, two clock lines may be used for a 32 bit control/address/data bus (with one half of the control/address/data bus referenced to one of the clock lines and the other half of the control/address/data bus and the control line referenced to the other one of the clock lines.

The control line indicates whether or not the data transmitted upon the control/address/data bus is either a bit time of a control packet or a bit time of a data packet. The control line is asserted to indicate a control packet bit time, and deasserted to indicate a data packet bit time. Certain control packets indicate that a data packet follows. The data packet may immediately follow the corresponding control packet. In one embodiment, other control packets may interrupt the transmission of a data packet. Such an interruption may be performed by asserting the control line for a number of bit times during transmission of the data packet and transmitting the bit times of the control packet while the control line is asserted. Control packets which interrupt a data packet may not indicate that a data packet will be following.

In one particular embodiment, the control line may also be used to stall the bit times of a control packet if the control packet did not interrupt a data packet. By deasserting the control line while a control packet is being transmitted, the bit times may be indicated as stall bit times and may be ignored by the receiver on the link. It is noted that stall bit times may be used as a synchronization event, in one embodiment.

The control/address/data bus comprises a set of lines for transmitting the data/control bits. In one embodiment, the control/address/data bus may comprise 8, 16, or 32 lines. Each processing node or I/O bridge may employ any one of the supported numbers of lines according to design choice. Other embodiments may support other sizes of control/address/data bus as desired.

According to one embodiment, the command/address/data bus lines and the clock line may carry inverted data (i.e. a logical one is represented as a low voltage on the line, and a logical zero is represented as a high voltage). Alternatively, lines may carry non-inverted data (in which a logical one is represented as a high voltage on the line, and logical zero is represented as a low voltage).

Turning now to FIG. 10, a block diagram of one embodiment of apparatus 10 employed within processing node 102B is shown. Other processing nodes 102 may include apparatus 10 as well, as desired. Other embodiments are possible and contemplated. Apparatus 10 may be included within, for example, interface logic 108D, 108E, and 108F. The embodiment of FIG. 10 is similar to the embodiment shown in FIG. 1. Buffer 12 is coupled to receive the CAD_L and CTL values conveyed on lines 124AB–124AC and is clocked by the CLK_L signal received on line 124AA. It is noted that lines 124AA–124AC may pass through appropriate receiver circuitry before arriving at apparatus 10.

Each entry in buffer 12 is therefore capable of storing one bit time of CAD_L and CTL information. Furthermore, unload muxes 16A–16B, output mux 18, output buffer 20, and staging buffer 22 are capable of transmitting one bit time of CAD_L and CTL information (e.g. 9, 17, or 33 bits according to one illustrative embodiment described above). As mentioned above, a bit time occurs at each edge of the CLK_L signal. Accordingly, buffer 12, output buffer 20, and staging buffer 22 each capture values in response to either edge (rising or falling) of the corresponding clock signal. Output buffer 20 and staging buffer 22 are clocked by a local clock signal on clock line 70. The local clock signal is derived from the clock signal on the CLK2 line shown in FIG. 9, and is intended to be of approximately the same frequency as the CLK_L signal. However, since the CLK_L and the local clock signal are sourced from different sources, some difference in actual frequency may be experienced. Apparatus 10 handles the differences in frequency (when CLK_L has the higher frequency) as described herein with respect to the staging buffer 22.

For the embodiment of FIG. 10, at least 3 transmit paths are defined. The transmit path selected by transmit path mux 24A routes to data buffers and corresponding logic within interface logic 108. The data transmit path is used for bit times which are carrying data (i.e. not command bit times, as indicated by the CTL signal of the bit time being deasserted). The transmit path selected by transmit path mux 24B routes to command buffers and corresponding logic within interface logic 108. The command transmit path is used for bit times which are carrying command information (as indicated by the CTL signal being asserted). Finally, the transmit path selected by transmit path mux 24C is used for bit times which are carrying cyclic redundancy check (CRC) data. CRC data is transmitted at predefined intervals, and is used to verify that the data received in each interval matches the data that was sent (i.e. that no errors were introduced during transmission). CRC data may be calculated from the data in the window using any suitable formula (e.g. the polynomial $x^{32}+x^{26}+x^{23}+x^{22}+x^{16}+x^{12}+x^{11}+x^{10}+x^8+x^7+x^5+x^4+x^2+x+1$ may be suitable).

Since the CRC data is transmitted at the end of each predefined interval (e.g. 512 bit times may be such an interval) and the CRC data is routed to a different transmit path than commands and data, the transmission of CRC data may be a synchronization event for apparatus 10. The event occurs at regular intervals, and hence the use of CRC data transmission as a synchronization event allows for variation in the frequency and which the source and target clocks operate. For example, if CRC data is transmitted every 512 bit times, frequency may vary by 1 part in 512 and the CRC data transmission provides enough synchronization events to allow proper operation of apparatus 10.

In another embodiment, CRC data may be captured directly from the link into separate flops. In such an embodiment, synchronization may occur by inhibiting the clocking of the CRC data into buffer 12, stalling the advance of the load counter. The unload counter may advance in the stalling bit time and hence "catch up". In such an embodiment, receive control logic 14 is configured to determine when the CRC data is transmitted.

Additionally, since data and command bit times are routed to separate transmit paths, receiving adjacent bit times of command and data may be a synchronization event. If the mix of command and data is specified for the link, these synchronization events can be relied upon for "catching up" in the same way the CRC data transmission is relied upon. Even if the mix is not specified, the occurrence of adjacent bit times of command and data may be used to catch up before the CRC data is transmitted.

Transmit control logic 26 may be configured to determine the bit times in which CRC data is transmitted by counting periods of the local clock signal, and thus to determine when a synchronization event occurs and when data from one or both of output buffer 20 and staging buffer 22 is to be selected by transmit path mux 24C. Additionally, transmit control logic 26 may receive the CTL bit from each of output buffers 20 and staging buffer 22 to both determine if a synchronization event is occurring and to determine which of transmit path muxes 24A–24B is to select the data in those buffers.

Figure 11:
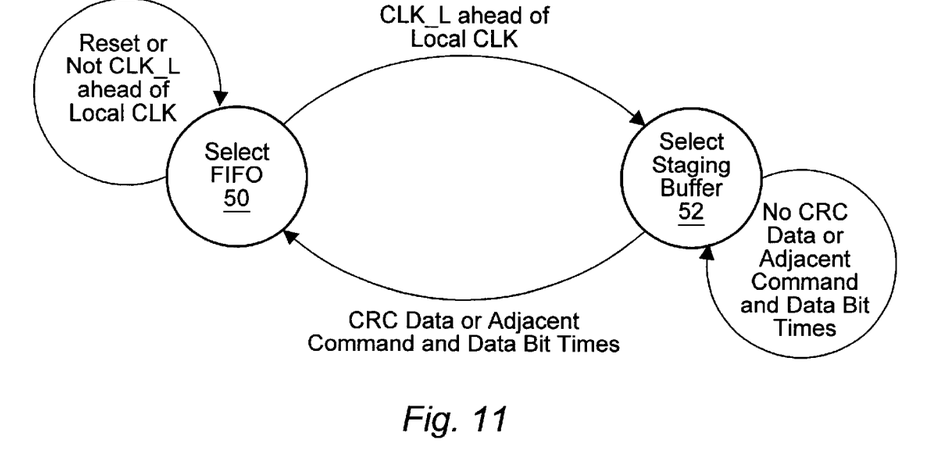
FIG. 11 is a state machine diagram illustrating one embodiment of a state machine for controlling an input to the output buffer shown in FIG. 10.

Turning next to FIG. 11, a state machine similar to the state machine shown in FIG. 5 is shown, including select FIFO state 50 and select staging buffer state 52. The state machine may operate similar to the state machine described in FIG. 5, and may be used to control output mux 18 as described. However, the state machine of FIG. 11 transitions from select FIFO state 50 to select staging buffer state 52 in response to detecting that the CLK_L signal on clock line 124AA gets ahead of the local clock. Similarly, the state machine of FIG. 11 transitions from select staging buffer state 52 to select FIFO state 50 in response to receiving CRC data or in response to receiving adjacent control and data bit times. It is noted that other embodiments are possible and contemplated.

Figure 12:
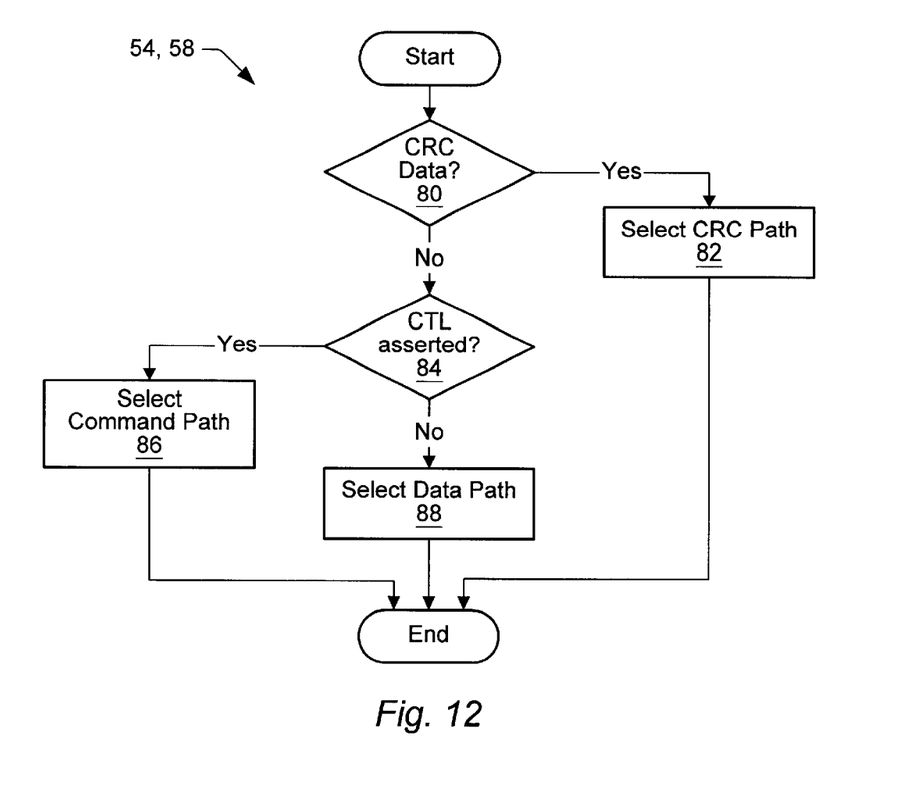
FIG. 12 is a flowchart illustrating one embodiment of logic for selecting a transmission path for data in the output buffer of FIG. 10.

Turning next to FIG. 12, a flowchart is shown comprising a more detailed realization of either step 54 or step 58 of the flowchart shown in FIG. 6 for an embodiment of apparatus 10 such as the embodiment of FIG. 10. Other embodiments are possible and contemplated. The steps illustrated in FIG. 12 are illustrated in a particular order for ease of understanding. However, any suitable order may be used. Furthermore, steps may be performed in parallel by combinatorial logic within transmit control logic 26. The term "corresponding buffer" will be used below with respect to the description of FIG. 12 to refer to output buffer 20 or staging buffer 22, depending upon whether step 54 or 58 is being performed.

Transmit control logic 26 determines if the corresponding buffer is storing CRC data based upon a bit time count maintained by transmit control logic 26 (decision block 80). If the corresponding buffer is storing CRC data, the CRC path is selected (step 82). In other words, transmit control logic 26 causes transmit path mux 24C to select the contents of the corresponding buffer via path select signals to transmit path mux 24C.

On the other hand, if the corresponding buffer is not storing CRC data, then transmit control logic 26 determines if the CTL signal in the corresponding buffer is asserted (decision block 84). If the CTL signal is asserted, the command path is selected (step 86). In other words, transmit control logic 26 causes transmit path mux 24B to select the contents of the corresponding buffer via path select signals to transmit path mux 24B. If the CTL signal is not asserted, the data path is selected (step 88). In other words, transmit control logic 26 causes transmit path mux 24A to select the contents of the corresponding buffer via path select signals to transmit path mux 24A.

Figure 13:
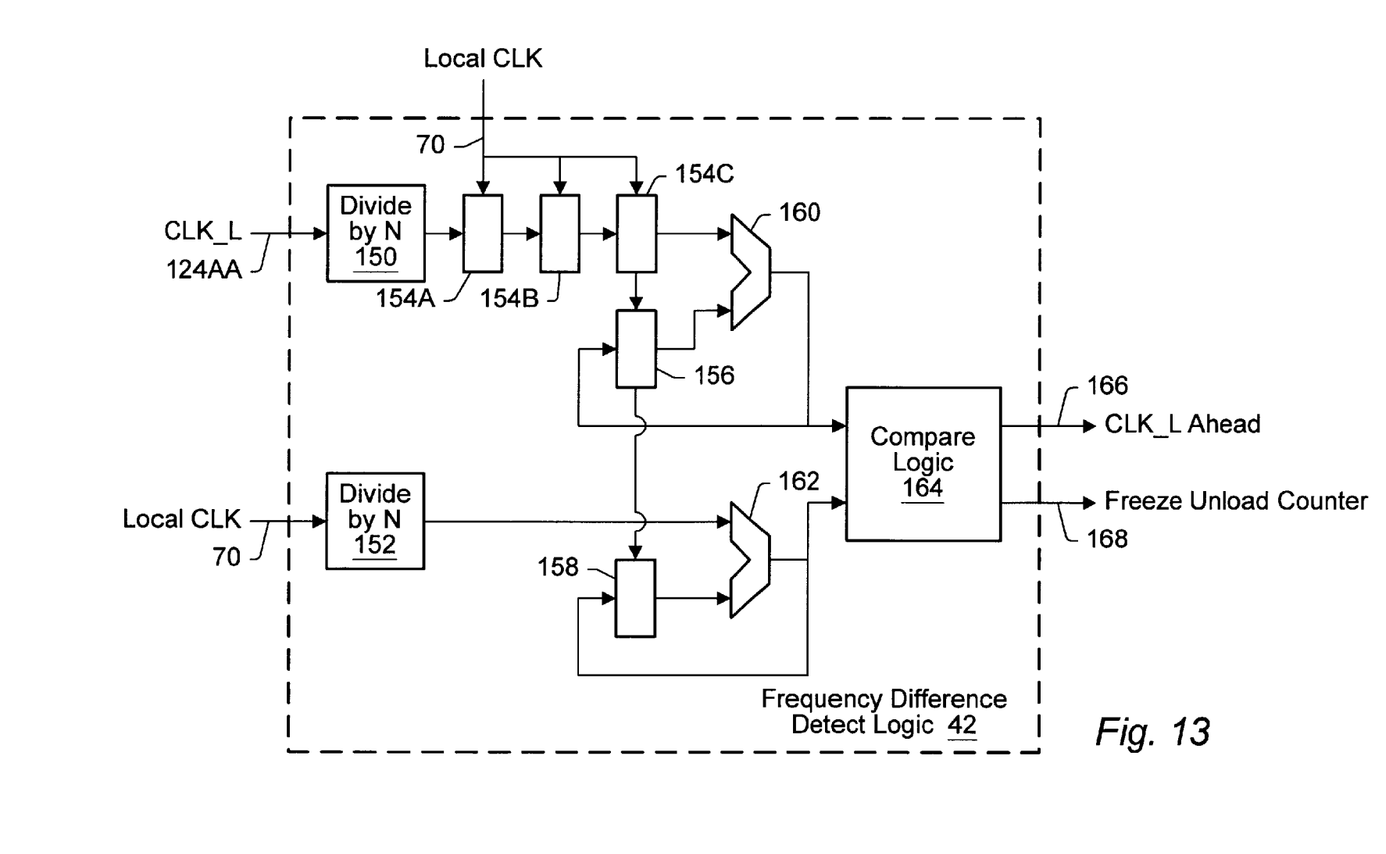
FIG. 13 is a block diagram of one embodiment of a portion of the transmit control logic shown in FIGS. 1 and 10.

Turning now to FIG. 13, a block diagram illustrating one embodiment of a frequency difference detect logic 90 is shown. Other embodiments are possible and contemplated. In the embodiment of FIG. 13, frequency difference detect logic 90 includes divide by N circuits 150 and 152, flops 154A–154C, 156, and 158, adder circuits 160 and 162, and compare logic 164. Divide by N circuit 150 is coupled to receive the CLK_L signal upon clock line 124AA and to a series connection of flops 154A–154C. Divide by N circuit 152 is coupled to receive the local clock signal on local clock line 70, and is further coupled to adder circuit 162. Flops 154A–154C are clocked by the local clock signal on local clock line 70, and the output of flop 154C is coupled to adder circuit 160. Flop 156 is coupled to adder circuit 160, which is further coupled to compare logic 164. Flop 158 is coupled to adder circuit 162, which is also further coupled to compare logic 164. Compare logic 164 is coupled to provide a CLK_L ahead signal on line 166 and a freeze unload counter signal on line 168. Frequency difference detect logic 90 may be employed within transmit control logic 26 in the embodiment of FIG. 10, and a similar circuit may be employed in the embodiments of FIG. 1 and FIG. 7.

Generally, the combination of flop 156 and adder circuit 160 forms a pulse counter for counting pulses corresponding to the CLK_L signal. Similarly, the combination of flop 158 and adder circuit 162 forms a pulse counter for counting pulses corresponding to the local clock signal. The pulse counts over a period of time are proportional to the frequencies of each clock.

Compare logic 164 compares the pulse counts provided by each pulse counter, and signals other logic within transmit control logic 26 accordingly. In this manner, differences in frequency may be accounted for by freezing the unload logic (if the local clock is operating at a higher frequency than the CLK_L clock) or by signalling that CLK_L is ahead (if the CLK_L clock is operating at a higher frequency than the local clock). Additionally, upon signalling the other logic via lines 166 or 168, the pulse counts may be reset. Compare logic 164 may output a clear signal to flops 156 and 158, for example, to clear the flops when the signalling occurs. Compare logic 164 may perform its compare at discrete times (e.g. in response to the edges of the local clock signal).

Since the CLK_L clock signal and the local clock signal are expected to be of approximately the same frequency, divide by N circuits 150 and 152 are used to divide the frequency of each clock signal. In this manner, pulses are detectable for each clock signal by the pulse counters (which operate at the frequency of the receiver clock). In other words, the pulses counted by the pulse counters are pulses from a wave form derived from the clock signals. The divisor for the divide by N circuits may be based upon the maximum difference which is expected to occur between the transmitter clock and the receiver clock. For example, divide by two may be selected.

Additionally, it is possible that sampling the transmitter clock signal according to the receiver clock signal may lead to metastability of the sampling flops. Flops 154A–154C provide a synchronization of the transmitter clock to the receiver clock, reducing the likelihood of experiencing metastability. In another embodiment, metastability may be addressed by providing a feedback path between each of flops 154A–154C outputs and the corresponding input. The muxes may be controlled to select the output of each flop as that flop's input during periods that metastability may occur, thereby preventing the passing of metastability from flop to flop.

As used herein, a flop is an edge-triggered storage element. In other words, the flop captures a value responsive to an edge of the clock signal (e.g. the rising edge, the falling edge, or both edges). Other storage elements (e.g. latches, registers, etc.) may be substituted as desired. Additionally, as an alternative to incrementing or decrementing the unload pointer, compare logic 164 may provide a new value for the unload pointer based upon its current value.

As used herein, the term "control logic" refers to any combination of combinatorial logic, storage devices, and/or state machines which operates upon inputs to produce outputs as described for each control logic.

Numerous variations and modifications will become apparent to those skilled in the art once the above disclosure is fully appreciated. It is intended that the following claims be interpreted to embrace all such variations and modifications.

What is claimed is:

1. An apparatus for translating data from a first clock domain to a second clock domain, the apparatus comprising:
    a buffer comprising a plurality of entries, wherein said buffer is clocked by a first clock signal corresponding to said first clock domain, and wherein each of said plurality of entries is configured to store a datum being translated from said first clock domain to said second clock domain;
    a staging buffer coupled to receive a first datum read from said buffer according to a second clock signal, said staging buffer clocked by said second clock signal corresponding to said second clock domain; and
    control logic coupled to receive said first clock signal and said second clock signal, wherein said control logic is configured to monitor said first clock signal and said second clock signal to determine if, during a period of said second clock signal, an amount of data received by said buffer exceeds an amount of data read from said buffer, and wherein said control logic is configured to detect a synchronization event, and wherein said control logic is configured to selectively forward one or both of: (i) said first datum, and (ii) a second datum read from said buffer responsive to determining said amount of data and to detecting said synchronization event.

2. The apparatus as recited in claim 1 further comprising:
    a multiplexor coupled to receive said first datum from said staging buffer and to receive said second datum read from said buffer, said multiplexor configured to provide one of said first datum and said second datum as an output, wherein said control logic is configured to control said multiplexor in response to determining if, during said period of said second clock signal, said amount of data received by said buffer exceeds said amount of data read from said buffer.

3. The apparatus as recited in claim 2 further comprising an output buffer coupled to receive said output of said multiplexor.

4. The apparatus as recited in claim 3 wherein said control logic is configured to cause said multiplexor to select said second datum if, during said period of said second clock signal, said amount of data received by said buffer does not exceed said amount of data read from said buffer.

5. The apparatus as recited in claim 4 wherein said control logic is configured to cause said multiplexor to select said first datum if, during said period of said second clock signal, said amount of data received by said buffer exceeds said amount of data read from said buffer.

6. The apparatus as recited in claim 5 wherein said control logic is configured to cause said multiplexor to continue selecting additional data from said staging buffer and to cancel selecting said additional data in response to said control logic detecting a synchronization event.

7. The apparatus as recited in claim 1 wherein data read from said buffer is routable to at least a first transmit path and a second transmit path independent of said first transmit path.

8. The apparatus as recited in claim 7 wherein said synchronization event comprises said first datum being routed to one of said first transmit path and said second transmit path, and said second datum concurrently being routed to another one of said first transmit path and said second transmit path.

9. The apparatus as recited in claim 1 wherein said data being translated from said first clock domain to said second clock domain comprises bit times of packets on a link clocked by said first clock signal.

10. The apparatus as recited in claim 9 wherein said synchronization event comprises one of said bit times being a portion of a command packet and an adjacent one of said bit times being a portion of a data packet.

11. The apparatus as recited in claim 9 wherein said synchronization event comprises receiving cyclic redundancy check (CRC) data.

12. A method for translating data from a first clock domain to a second clock domain, the method comprising:
    receiving data into a buffer according to a first clock signal corresponding to said first clock domain;
    reading a first datum from said buffer into a staging buffer according to a second clock signal corresponding to said second clock domain;
    reading a second datum from said buffer according to said second clock signal; and
    selectively transmitting said first datum and said second datum into said second clock domain responsive to determining if, during a period of said second clock signal, an amount of data received by said buffer exceeds an amount of data read from said buffer and further responsive to detecting a synchronization event.

13. The method as recited in claim 12 wherein said selectively transmitting comprises selecting said second datum if, during said period of said second clock signal, said amount of data received by said buffer does not exceed said amount of data read from said buffer.

14. The method as recited in claim 13 wherein said selectively transmitting further comprises selecting said first datum if, during said period of said second clock signal, said amount of data received by said buffer exceeds said amount of data read from said buffer.

15. The method as recited in claim 14 further comprising:
    continuing to select data from said staging buffer subsequent to selecting said first datum;
    detecting a synchronization event; and
    canceling said continuing in response to said detecting.

16. The method as recited in claim 15 wherein said synchronization event comprises receiving a third datum to be routed to a first transmit path and receiving a fourth datum adjacent to said third datum, wherein said fourth datum is to be routed to a second transmit path independent of said first transmit path.

17. The method as recited in claim 16 wherein said data being translated from said first clock domain to said second clock domain comprises bit times of command and data packets.

18. The method as recited in claim 17 wherein said third datum being a command bit time and said fourth datum being a data bit time comprises said synchronization event.

19. The method as recited in claim 17 wherein said third datum being cyclic redundancy check (CRC) data comprises said synchronization event.

20. A computer system comprising:
a first processing node coupled to a link including one or more data lines and a clock line, said first processing node configured to drive data upon said data lines and a first clock signal upon said clock line; and
a second processing node coupled to said link, wherein said second processing node is configured to receive said data according to said first clock signal and to process said data according to a second clock signal derived from a different source than said first clock signal, said second processing node comprising:
a buffer comprising a plurality of entries, wherein said buffer is clocked by said first clock signal, and wherein each of said plurality of entries is configured to store data being received on said one or more data lines in response to said first clock signal;
a staging buffer coupled to receive a first datum read from said buffer, said staging buffer clocked by said second clock signal; and
control logic coupled to receive said first clock signal and said second clock signal, wherein said control logic is configured to monitor said first clock signal and said second clock signal to determine if, during a period of said second clock signal, an amount of data received by said buffer exceeds an amount of data read from said buffer, and wherein said control logic is configured to detect a synchronization event, and wherein said control logic is configured to selectively forward one or both of: (i) said first datum, and (ii) a second datum read from said buffer responsive to determining said amount of data and to detecting said synchronization event.

21. The computer system as recited in claim 20 wherein said link comprises a plurality of data lines and a control line, and wherein a signal on said control line is indicative of whether said plurality of data lines represent control information or data information.

22. The apparatus as recited in claim 20 further comprising:
a multiplexor coupled to receive said first datum from said staging buffer and to receive said second datum read from said buffer, said multiplexor configured to provide one of said first datum and said second datum as an output, wherein said control logic is configured to control said multiplexor in response to determining if, during said period of said second clock signal, said amount of data received by said buffer exceeds said amount of data read from said buffer.

23. The computer system as recited in claim 22 wherein said control logic is configured to cause said multiplexor to select said second datum if, during said period of said second clock signal, said amount of data received by said buffer does not exceed said amount of data read from said buffer.

24. The computer system as recited in claim 23 wherein said control logic is configured to cause said multiplexor to select said first datum if, during said period of said second clock signal, said amount of data received by said buffer exceeds said amount of data read from said buffer.

25. The computer system as recited in claim 24 wherein said control logic is configured to continue causing said multiplexor to select data from said staging buffer and to cancel selecting data from said staging buffer in response to detecting a synchronization event.

26. The computer system as recited in claim 20 wherein said synchronization event comprises receiving one bit time of a command packet and an adjacent bit time is a bit time of a data packet.

27. The computer system as recited in claim 20 wherein said synchronization event comprises receiving cyclic redundancy check (CRC) data.

* * * * *